US008633907B2

(12) United States Patent
Mahalingam

(10) Patent No.: US 8,633,907 B2
(45) Date of Patent: Jan. 21, 2014

(54) TOUCH SCREEN OVERLAY FOR VISUALLY IMPAIRED PERSONS

(76) Inventor: Padmanabhan Mahalingam, Madras (IN)

( * ) Notice: Subject to any disclaimer, the term of this patent is extended or adjusted under 35 U.S.C. 154(b) by 400 days.

(21) Appl. No.: 12/830,609

(22) Filed: Jul. 6, 2010

(65) Prior Publication Data

US 2012/0007809 A1   Jan. 12, 2012

(51) Int. Cl.
*G06F 3/041* (2006.01)

(52) U.S. Cl.
USPC ......... 345/173; 178/18.01; 340/4.1; 340/4.12

(58) Field of Classification Search
USPC ............... 345/173–183; 178/18.01–18.11; 178/19.01–19.07; 340/4.1, 4.11–4.14; 379/52
See application file for complete search history.

(56) References Cited

U.S. PATENT DOCUMENTS

| | | | | |
|---|---|---|---|---|
| 4,037,200 A | * | 7/1977 | Cranmer | 341/21 |
| 4,871,992 A | * | 10/1989 | Petersen | 340/407.1 |
| 5,293,464 A | * | 3/1994 | Hirano et al. | 358/1.1 |
| 5,902,112 A | * | 5/1999 | Mangold | 434/112 |
| 5,947,741 A | * | 9/1999 | Villarreal | 434/171 |
| 6,424,338 B1 | * | 7/2002 | Anderson | 345/173 |
| 6,734,785 B2 | * | 5/2004 | Petersen | 340/407.1 |
| 6,864,878 B2 | * | 3/2005 | Stohrer et al. | 345/156 |
| 7,184,032 B2 | * | 2/2007 | Stohrer et al. | 345/173 |
| 7,352,356 B2 | * | 4/2008 | Roberts et al. | 345/156 |
| 2002/0003469 A1 | * | 1/2002 | Gupta | 340/407.1 |
| 2003/0117490 A1 | * | 6/2003 | Tecu et al. | 348/62 |
| 2003/0184524 A1 | * | 10/2003 | Stohrer et al. | 345/173 |
| 2004/0001734 A1 | * | 1/2004 | Burrell, IV | 400/472 |
| 2004/0090427 A1 | * | 5/2004 | Blair et al. | 345/173 |
| 2004/0090428 A1 | * | 5/2004 | Crandall et al. | 345/173 |
| 2005/0030296 A1 | * | 2/2005 | Stohrer et al. | 345/173 |
| 2005/0179565 A1 | * | 8/2005 | Mase et al. | 341/21 |
| 2006/0280294 A1 | * | 12/2006 | Zhang | 379/52 |
| 2007/0229233 A1 | * | 10/2007 | Dort | 340/407.1 |
| 2008/0167081 A1 | * | 7/2008 | Eng | 455/566 |
| 2009/0143142 A1 | * | 6/2009 | Marcus et al. | 463/37 |
| 2009/0160813 A1 | * | 6/2009 | Takashima et al. | 345/173 |
| 2009/0278810 A1 | * | 11/2009 | Ma et al. | 345/173 |
| 2010/0085168 A1 | * | 4/2010 | Kyung et al. | 340/407.1 |
| 2010/0328052 A1 | * | 12/2010 | Pasquero et al. | 340/407.2 |
| 2010/0328231 A1 | * | 12/2010 | Pasquero et al. | 345/173 |
| 2011/0184824 A1 | * | 7/2011 | George et al. | 705/24 |

* cited by examiner

*Primary Examiner* — Gene W Lee
(74) *Attorney, Agent, or Firm* — Donald R. Boys; Central Coast Patent Agency, Inc.

(57) ABSTRACT

A touch screen overlay includes a flexible, substantially planar portion having length and width dimensions corresponding to a touch screen of an electronics appliance, one or more features for aligning the substantially planar portion with the touch screen, and a pattern of raised features and/or openings, providing facility for a person to interact with individual features or openings by touch rather than be sight.

6 Claims, 4 Drawing Sheets

TOUCH SCREEN OVERLAY FOR VISUALLY IMPAIRED PERSONS

BACKGROUND OF THE INVENTION

1. Field of the Invention

The present invention is in the field of electronic input devices for computing appliances and pertains particularly to methods and apparatus for inputting information through the use of a touch screen.

2. Discussion of the State of the Art

In the field of electronic input devices for computing appliances, touch screens have evolved to become a primary input device for some computing and communications appliances. A touch screen uses capacitive or resistive methods to enable a user to touch a graphic or link displayed on the screen to interact with that graphic or link according to one or more interaction rules.

Touch screens are becoming a common primary input device for third and fourth generation cellular telephones, personal digital assistants (PDAs), music players, such as iPods, and in some cases Laptop computers. In applications where the touch screen is the primary input device, the touch capability of the device is always on. In applications where the touch screen is not the primary input device such as with devices having a keyboard and mouse, for example, the touch technology may be toggled on or off.

While touch screen technology has been beneficial in many applications, more innovation is required in order to extend touch screen capabilities to those users that have visual impairments or disabilities. Persons that are blind or severely visually impaired require special input devices to enable them to interact with a variety of electronic communications and computing appliances such as those described above. A touch screen displays graphics and text entries as interactive links that may be touched or tapped to invoke those links. A problem in the current art is that current means for interacting with touch screens have no provisions for visually impaired individuals other than magnification schemes for those who are not totally blind. Those without sufficient vision capability must use some other structured form of data input like speech to text, Braille keyboard, etc.

Therefore, what is clearly needed is a system and methods for enabling visually impaired persons to interact with touch screens as viable input devices associated with myriad electronics communications and computing appliances.

SUMMARY OF THE INVENTION

The problem stated above is that input capability for the visually impaired is desirable for an electronics communications or computing device, but many of the conventional means for accessing features on such devices or appliances for the visually impaired such as magnifiers or voice command interfaces also create complexity. The inventors therefore considered functional components of input devices, looking for elements that exhibit interoperability that could potentially be harnessed to provide a means for input but in a manner that would not create complexity or extra work.

Every electronics communications device or computing appliance depends on user generated input for general operation and invocation of specific features. One by-product of that is an abundance of input mechanisms such as computer mice, touch screens, click screens, and voice command interfaces. Many communications and computing devices employ touch or click screen interfaces to enable input, navigation, and display at the same interface.

The present inventor realized in an inventive moment that if, at the point of interaction, a method of data input could be invoked on a touch screen by a visually impaired person, less complexity and work might result. The inventor therefore developed a unique overlay system including Software (SW) for touch screens that allows visually impaired users to enter commands and general input into a communications appliance or computing appliance. A significant reduction in work results, with no impediment to user friendliness created.

Accordingly, in one embodiment of the invention, a touch screen overlay is provided, comprising a flexible, substantially planar portion having length and width dimensions corresponding to a touch screen of an electronics appliance, one or more features for aligning the substantially planar portion with the touch screen, and a pattern of raised features and/or openings, providing facility for a person to interact with individual features or openings by touch rather than be sight. In one embodiment the pattern comprises one of a six-point or an 8-point Braille pattern. Also in one embodiment the pattern comprises separate features or openings for long and short input for Morse code. In another embodiment the pattern comprises separate features or openings for a marine semaphore system of input.

In another aspect of the invention a digital touch screen enabled device is provided, comprising a touch screen for accepting touch input, a flexible overlay having a substantially planar portion having length and width dimensions corresponding to a touch screen of an electronics appliance, one or more features for aligning the substantially planar portion with the touch screen, and a pattern of raised features and/or openings, providing facility for a person to interact with individual features or openings by touch rather than be sight, and software executing on the device from a machine-readable physical medium, the software providing touch sensitive areas on the touch screen in the pattern of the raised features and/or openings of the flexible overlay.

In one embodiment of the device the pattern comprises one of a six-point or an 8-point Braille pattern. Also in one embodiment the pattern comprises separate features or openings for long and short input for Morse code. In still another embodiment the pattern comprises separate features or openings for a marine semaphore system of input.

In another aspect of the invention a method for providing input to a touch screen of a digital device is provided, comprising steps of (a) applying to the digital device an overlay comprising a flexible, substantially planar portion having length and width dimensions corresponding to a touch screen of the digital device, one or more features for aligning the substantially planar portion with the touch screen, and a pattern of raised features and/or openings, providing facility for a person to interact with individual features or openings by touch rather than be sight; and (b) executing software on the device from a machine-readable physical medium, the software providing interactive regions on the touch screen arranged in the pattern of the raised features and/or openings.

In one embodiment of the method the pattern comprises one of a six-point or an 8-point Braille pattern. Also in one embodiment the pattern comprises separate features or openings for long and short input for Morse code. In another embodiment the pattern comprises separate features or openings for a marine semaphore system of input.

BRIEF DESCRIPTION OF THE DRAWING FIGURES

DETAILED DESCRIPTION

The inventor provides unique touch screen overlays and software for enabling a touch screen interface that may be used by a visually impaired person to send a message using one of a variety of alphanumeric techniques. The methods and apparatus of the present invention are described in enabling detail using the following examples, which may illustrate more than one embodiment of the present invention.

Figure 1:
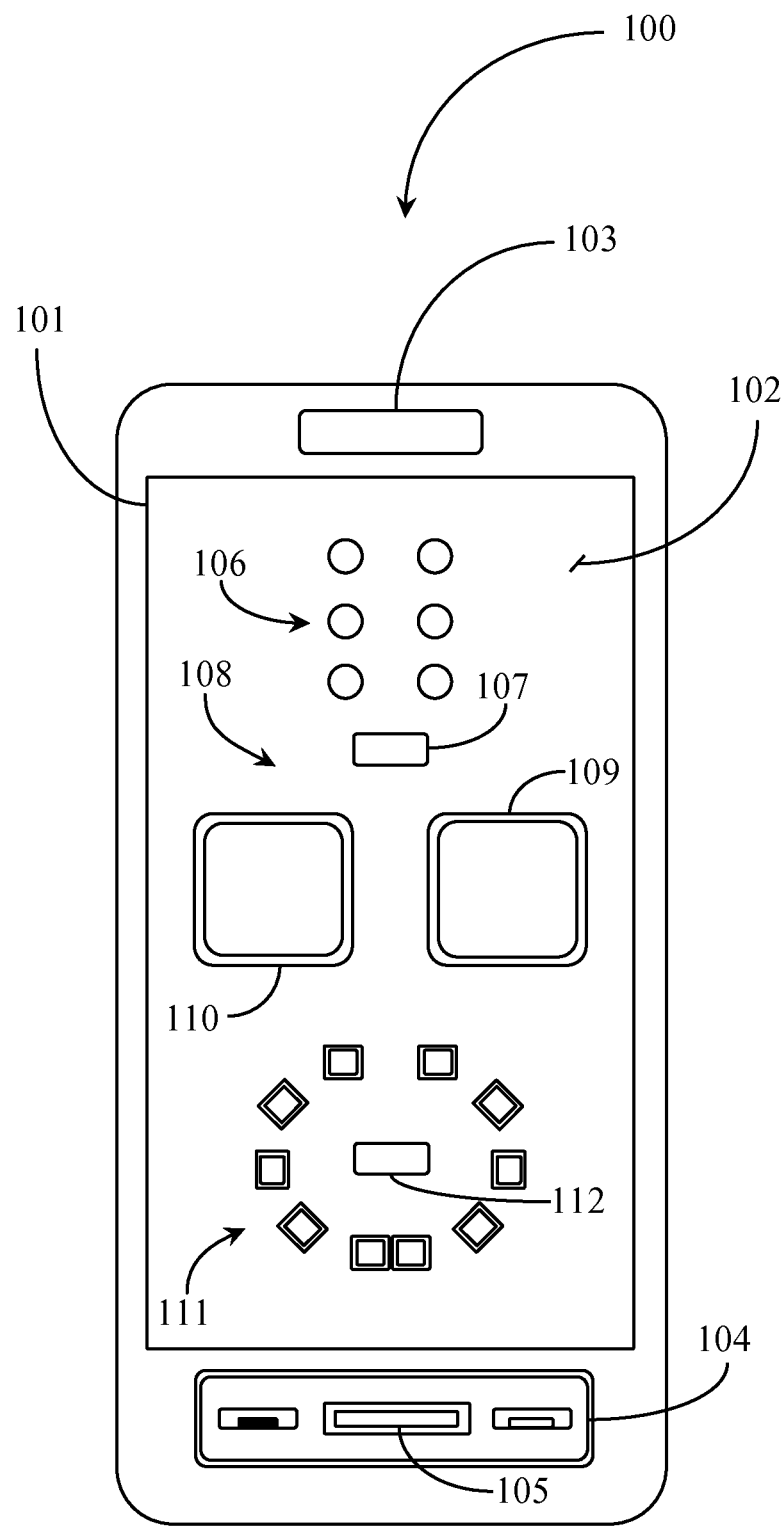
FIG. 1 is an elevation view of a communications appliance supporting a touch screen interface according to an embodiment of the present invention.

FIG. 1 is an elevation view of a communications appliance 100 supporting a touch screen interface 101 according to an embodiment of the present invention. Communication appliance 100 is a cellular telephone or "smartphone" in this embodiment. Smartphone 100 includes a touch screen 101 that is adapted to display information and to accept user input through use of a stylus or a user's fingers. In one embodiment touch screen 101 uses capacitive technology to sense a touch. In another embodiment touch screen 101 uses resistive technology to sense pressure from a touch. Smartphone 100 has a speaker 103 and a microphone (not illustrated).

Smartphone 100 includes a quick-control interface 104 and a central Web navigation control 105. Smartphone 100 may instead be a Laptop computing appliance enabled with a touch screen interface similar to interface 101. In another embodiment of the present invention appliance 100 may be a personal digital assistant (PDA) without departing from the spirit and scope of the present invention. The present invention is applicable to any electronics appliance that has an existing touch screen and can be used for text messaging and or telephony.

Smartphone 100 has a touch screen overlay 102 disposed over touch screen 101. In this example, touch screen overlay 102 has substantially the same area as touch screen 101. Touch screen overlay 102 in this embodiment is adapted to fit directly over the touch screen and includes one or more raised patterns or features. Raised patterns and features may work directly for pressure sensitive touch screens, but will not serve for capacitive-sensitive touch screens. In the case of capacitive sensitivity, apertures (openings) in the overlay are used to provide access to the touchscreen surface for acceptance of an input by the screen. Raised features may be provides as guides or locators for the openings in this case.

Overlay 102 may be molded from a polymer, a rubber material, or polymer/rubber composite, enabling flexibility and a certain amount of natural adherence afforded between the overlay interfacing surface and the surface of the existing touch screen on smartphone 100. In some cases the overlay will be a part of a skin that may fit over the device as well as the touch screen. The overlay 102 may be transparent or opaque.

Overlay 102 has one or more raised patterns or openings that are provided to emulate specific alphanumeric communications interfaces. A six-point Braille interface 106 is provided on overlay 102. The six points are shown as a matrix of dots in two columns, but may be openings or raised features, as circumstances may dictate. In some cases there may be a pattern of openings, providing access to sensitive portions of the screen, and there may also be raised features provided adjacent to the openings as guides to the openings. Braille interface 106 generally comprises raised detail and/or openings that may be formed during a molding process used to make overlay 102. In this example, interface 106 is a six-point Braille interface. Software (not illustrated) installed on smartphone 100 provides touch sensitivity to the areas of the touchscreen in accordance with the pattern of the overlay, which makes possible the reading and use of Braille input made through Braille interface 106 on overlay 102.

A user may serially or simultaneously touch a combination of the openings or raised features to register a letter of the alphabet, a number, or a punctuation mark. In one embodiment a sensitive position 107 is provided in the touchscreen with appropriate access in the overlay, along with Braille interface 106, and is adapted to enable a user to register a single letter, number, or punctuation mark made by touching one or more positions in the six-point raised pattern. Input 107 may also be used as a stop between Braille characters enabling the software to determine when a character is to be recorded before a next character is input by the user.

In one embodiment of the present invention, overlay 102 includes a Morse code interface 108. Interface 108 comprises two separate regions defined in this example by raised boundaries 109 and 110. The raised boundaries or ridges of features 109 and 110 are formed in molding the overlay. The boundaries simply define openings at sensitive touch screen regions where touch may be used to signal in Morse coding. A visually impaired person may locate interface 108 and regions 109 and 110 by touch. Region 109 may signal long inputs and region 110 may signal short inputs. Therefore, a user operating interface 108 may apply pressure by touch within both regions to emulate a Morse code interface. The software described above may be adapted to parse and record the Morse coding implemented through interface 108.

In one embodiment overlay 102 only includes Braille interface 106. In one embodiment all of the characters used in basic Braille are provided on overlay 102 causing the overlay to function as a Braille keyboard. A Morse code interface is not required to practice the invention. In this example, overlay 102 also includes a Marine semaphore interface 111 representing an alphanumeric system of flag positions. There are ten flag positions in this example that represent the possible flag positions of two flags. The flag positions of interface 111 are represented by raised boundaries similar to boundaries 109 and 110 except much smaller.

To represent a specific character a user operating interface 111 on overlay 102 may select a first and then a second flag position by applying touch within the area bounded by the raised boundaries. A confirmation button 112 may be provided as a raised button used to signal the end of a specific character. A user may simultaneously or serially select two flag positions indicative of a character by depressing the area within the flag boundary. In one embodiment Marine semaphore flag positions indicating a letter, number, or punctuation mark are provided as individual selectable flag pairs the flags assuming their relative positions in the display for each character. The chart may take up most if not all of the area of touch screen overlay 102.

In this embodiment all three interfaces, Braille, Morse code, and Marine semaphore are provided on overlay 102 so that the user may choose which interface to use to communicate, but this is simply an example. In most cases only one communication interface will be provided with a single overlay, and overlays may also vary in certain characteristics according to characteristics of the communication devices having touch screens with which they are designed to integrate. For example, an overlay may be provided for a Motorola™ cell phone, which will be different than an overlay provided for an iPhone™.

Software described further above is also responsible for converting the input into machine readable and then perhaps human readable text. A user may communicate a message using one of interfaces 106, 108, or 111. The user may provide all of the characters that make up the message and when finished may invoke a hardware key such as an enter key or send key. The name of the intended recipient may be identified in the message as well.

The SW of the present invention provides touch sensitivity mapping on a device which is mirrored in the overlay. The SW also interprets input by the user through the selected or available interface and automatically generates a text message such as a Short Message Service (SMS) or Media Message Service (MMS) message or an email message. In one embodiment the SW is enabled with a text to speech component that records a voice message from the converted text. The appliance then automatically sends the text or voice message to an intended recipient identified through the interface. The SW of the invention is described in detail later in this specification.

Figure 3:
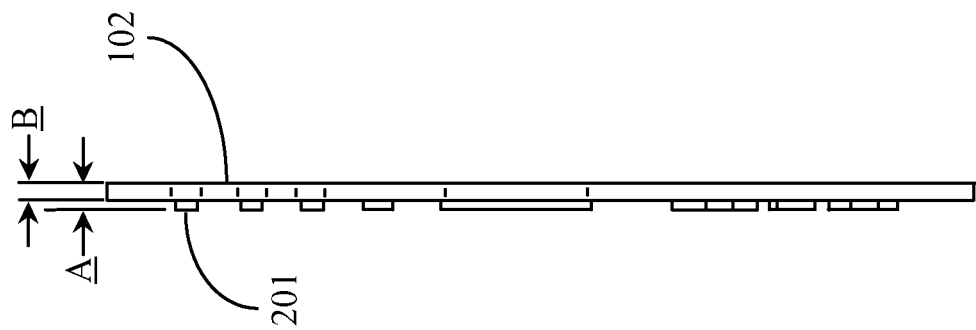
FIG. 3 is a right side view of the touch screen overlay of FIG. 2.
Figure 2:
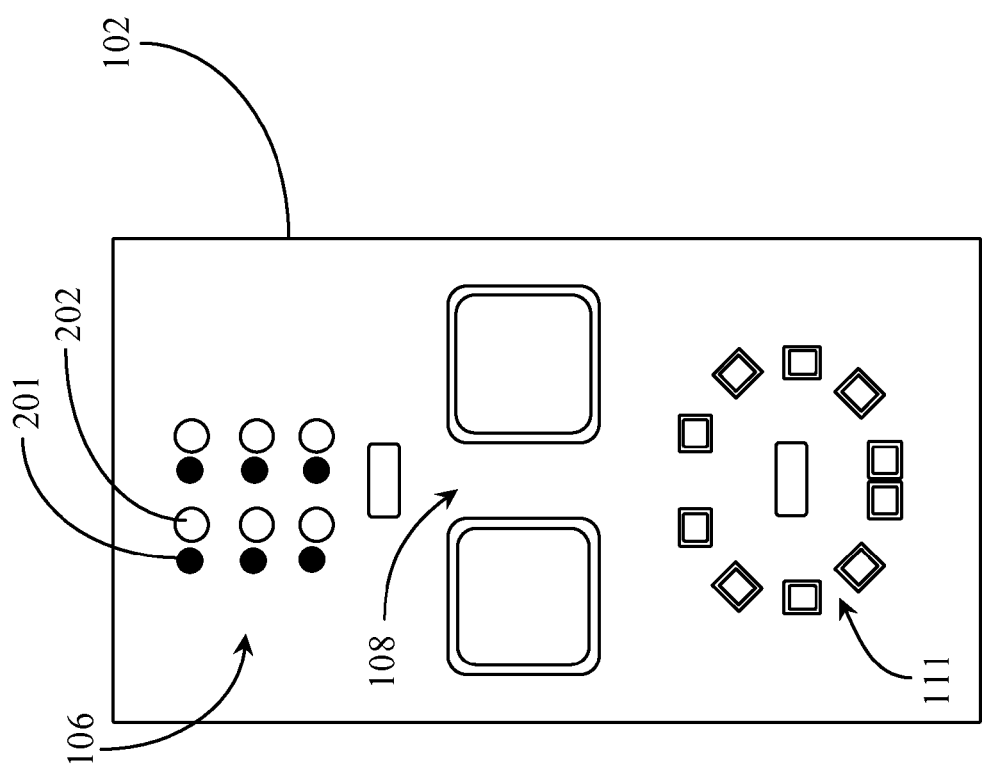
FIG. 2 is an elevation view of a touch screen overlay according to an embodiment of the present invention.

FIG. 2 is an elevation view of the touch screen overlay of FIG. 1 according to an embodiment of the present invention. FIG. 3 is a right side view of the touch screen overlay of FIG. 2. Referring now to FIG. 2, overlay 102 is provided with a footprint that is substantially the same as the touch screen it is laid over. One or more divots or pips (not illustrated) might be provided on the surface of overlay 102, perhaps near the corners to help a visually impaired person to correctly orientate and place the overlay over the touch screen of the appliance. In another embodiment the overlay may be one surface of a slip-on cover that may be stretched and then placed over the device, so the overlay correctly aligns with the touch screen. The overlay may also be a part of a glove-like skin that may fit over the device, accomplishing the same purpose. A variety of overlay sizes might be provided for application to different sizes of touch screens on a variety of supported appliances Referring now to FIG. 3, overlay 102 has an overall thickness A, which incorporates the basic material thickness B. Raised patterns and features will be raised just enough to enable a user to feel the patterns and or features. Applying pressure to a raised feature, used in the case of a pressure-sensitive touch screen, enables the touch screen below to interpret the actions in relevancy to the Braille interface as long as the underlying software of the invention is running. In some cases a raised feature on the screen side of the overlay may be used to concentrate input at a particular location on the touch screen. In other cases, the Braille interface features may be openings, as described above, more useful with capacitance-type touch screens.

Figure 4:
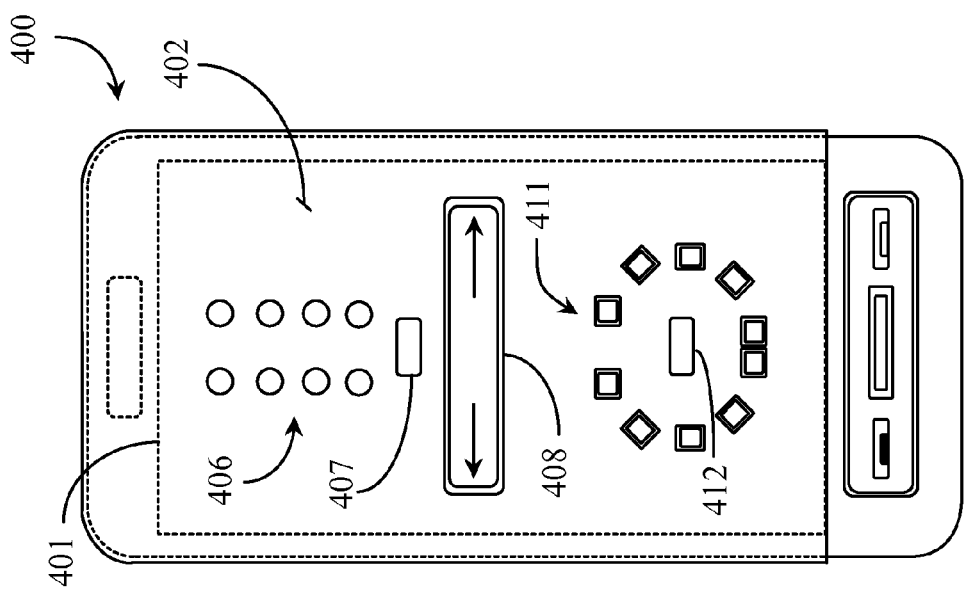
FIG. 4 is an elevation view of a communications appliance supporting a touch screen interface according to another embodiment of the present invention.

FIG. 4 is an elevation view of a communications appliance 400 supporting a touch screen interface 401 according to another embodiment of the present invention. Appliance 400 is a smart phone similar or analogous to smart phone 100 introduced and described further above. Appliance 400 supports a touch screen overlay 402 that is similar to but somewhat different from touch screen overlay 102 previously described.

Overlay 402 includes an 8-point Braille interface instead of the 6-point interface previously described. A character confirmation button 407 is analogous to button 107 described previously in FIG. 1. Overlay 402 includes a raised boundary feature 408 emulating a Morse code interface that is very different than interface 108 previously described. Instead of two separate regions, interface 408 is a single elongate region within which a user may slide a finger in one direction or the other direction as indicated by the arrows. Sliding the finger to the left may indicate a short input and sliding the finger to the right may indicate a long input for Morse code.

Overlay 402 includes a Marine semaphore interface 411 that is analogous to the interface 111 described in FIG. 1 of this specification. A character confirmation button 412 is provided and is analogous to button 112 also of FIG. 1. It is to be understood as well that raised features and/or openings may be implemented as required by circumstance and character of various touch screens, as described further above regarding FIGS. 1-3.

Figure 5:
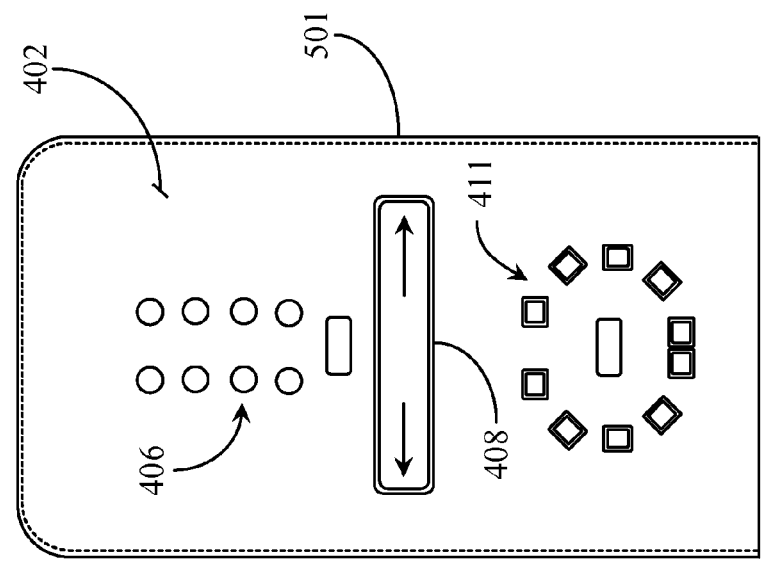
FIG. 5 is an elevation view of the touch screen overlay of FIG. 4.

FIG. 5 is an elevation view of touch screen overlay 402 of FIG. 4. Overlay 402 is designed, in this case, to fit over the entire top portion of the smart phone, covering it from the top down to the bottom edge of the touch screen. Overlay 402 may be molded of the same or similar materials described further above with respect to overlay 102. Overlay 402, unlike overlay 102 described previously has a sidewall 501 of minimal thickness extending completely around the overlay from the bottom edge of the overlay. Sidewall 501 is used to orientate overlay 402 over the supporting smart phone. It is noted herein that different sizes and styles of overlay may be provided to fit specific model appliances.

Figure 6:
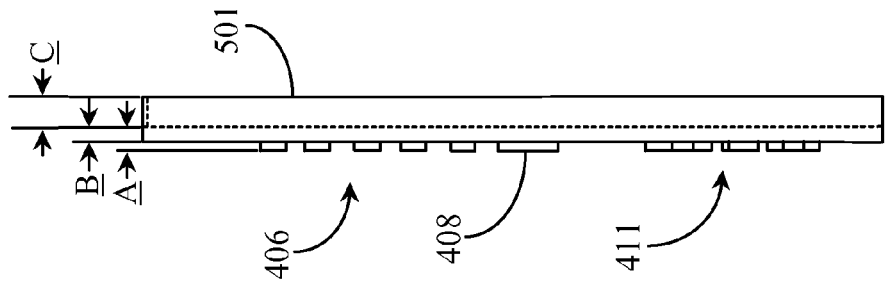
FIG. 6 is a right side view of the touch screen overlay of FIG. 5.

FIG. 6 is a right side view of touch screen overlay 402 of FIG. 5. Overlay 402 exhibits dimensions A and B analogous to the dimensions of FIG. 3. Sidewall 501 has a dimension C that is just large enough to enable alignment of the overlay about the top edge and sides of the smartphone. In this embodiment overlay 402 is removable and replaceable.

Figure 7:
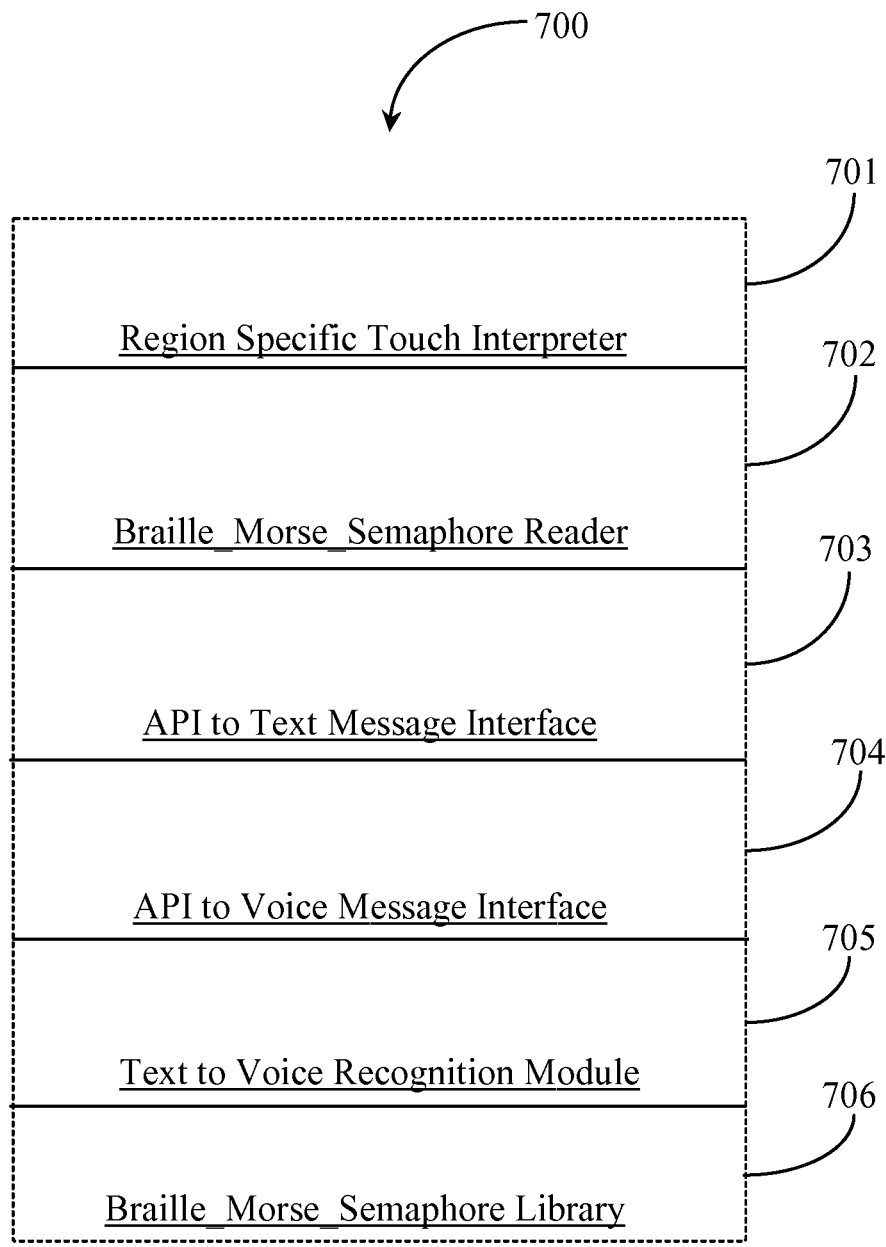
FIG. 7 is a block diagram illustrating a software application supporting the touch screen interface of the present invention.

FIG. 7 is a block diagram illustrating a software application 700 supporting the touch screen interface of the present invention. SW 700 is adapted as an executable program that can be downloaded to a communications or computing appliance like a smartphone for example. SW 700 includes a region specific touch interpreter 701. Interpreter 701 recognizes the interface or interfaces on the overlay including individual positions of the raised dot pattern of the Braille interface and the raised boundary of the Morse code interface and of the flags of the Marine semaphore interface. Whenever touch pressure is applied to any one of the specified regions, the SW detects it and records it.

SW 700 includes a character reader 702 that may be adapted to read Braille, Morse code and Marine semaphore characters. The reader parses in real time as a user is operating through the overlay and inputting characters through any one of the included or supported interfaces. It is noted that only one interface of the types discussed need be provided to practice the present invention.

SW 700 includes an application program interface (API) to a text messaging interface loaded on the communications or computing appliance, in this case, a smartphone. The text messaging interface may be an instant message interface, a SMS or MMS interface, or an email interface. In one embodiment API 703 is compatible with a variety of messaging programs and services and may be operated in conjunction with more than one optional messaging interface. A default messaging interface may be assigned so that when in operation, character input may be applied to a message template generated by the associated messaging service. In practice, characters input through the overlay are converted to human readable language and inserted into the body of a text message that may then be sent to an intended recipient over a communications network.

In one embodiment SW 700 includes an API to a voice messaging interface. In this case characters input through the overlay are interpreted by the SW and converted to standard language text before being parsed by a text to voice recognition module 705 and synthesized as a voice message that may be sent to a voice mail inbox, a voice enabled end device like a cellular telephone, or an end computing appliance having voice messaging capabilities.

Braille_Morse_Semaphore reader 702 uses a character library 706 that includes all of the relevant characters depending on the type or types of interfaces provided on overlay 402. The library is used to recognize Braille characters, for example, before they are rendered as normal text for inserting into a message for send. Voice mail would require an additional step of voice synthesis of the text into a compact voice message. Library 706 may be installed on an internal or external memory device that is accessible to the host appliance.

In one embodiment of the present invention, the instructions for messaging including adding one or more contacts to the recipient list of the message are input from the same interface as the message. SW 700 has access to all of the listed contacts through the API and may, in one embodiment, be adapted to prompt a visually impaired user to enter characters for specific messaging fields such as recipient, subject line, Carbon Copy (CC), Blind Carbon Copy (BCC), etc. The present invention may be used to input text for messaging or for inserting into documents, etc.

It is to be understood that touch screen interfaces and associated overlay may be provided 9 in many other forms and patterns than those described in various embodiments herein. For example, in many instances inputs other than the 6-point or 8-point standard Braille inputs may be needed, to provide for correction, such as Undo, Repeat, and other functionality as may be deemed needed in the touch screen and the overlay to best serve the needs of the visually impaired, or otherwise impaired person. The inventive aspect is the matching of the overlay, and character of the overlay, to digital devices and in particular touch screens, and in the mapping of features between the touch screens and the overlays.

It will be apparent to one with skill in the art that the touch screen overlay system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A touch screen overlay comprising:
   a flexible, substantially planar portion having length and width dimensions corresponding to a touch screen of an electronic device;
   one or more features for aligning the substantially planar portion with the touch screen; and
   a pattern of a plurality of tactile features forming a single Braille pattern providing facility for user interaction with individual features by touch rather than sight;
   characterized in that, through non-simultaneous sequential interaction with a subset of the plurality of tactile features, specific individual alphanumeric characters are interpreted and input into the electronic device via the touch screen.

2. The touch screen overlay of claim 1 wherein the single Braille pattern comprises one of a six-point or an 8-point Braille pattern.

3. A digital touch screen enabled device, comprising:
   a touch screen for accepting touch input;
   a flexible touch screen overlay having a substantially planar portion having length and width dimensions corresponding to the touch screen, one or more features for aligning the substantially planar portion with the touch screen, and a pattern of a plurality of tactile features forming a single Braille pattern providing facility for a user interaction with individual features by touch rather than sight; and
   software executing on the device from a machine-readable physical medium, the software providing touch sensitive areas on the touch screen in corresponding to the single Braille pattern of the tactile features of the overlay;
   characterized in that, through input of non-simultaneous sequential interaction with a subset of the plurality tactile features, specific individual alphanumeric characters are interpreted by the software.

4. The device of claim 3 wherein the single Braille pattern comprises one of a six-point or an 8-point Braille pattern.

5. A method for providing input to a touch screen of a digital device, comprising steps of:
   (a) applying to the digital device an overlay comprising a flexible, substantially planar portion having length and width dimensions corresponding to a touch screen of the digital device, one or more features for aligning the substantially planar portion with the touch screen, and a pattern of a plurality of tactile features forming a single Braille pattern which provide facility for user interaction with individual tactile features openings by touch rather than sight; and
   (b) executing software on the device from a machine-readable physical medium, the software providing interactive touch sensitive regions on the touch screen arranged in, and corresponding to the individual tactile features of the flexible overlay;
   wherein through non-simultaneous sequential interaction with a subset of the plurality of tactile features specific individual alphanumeric characters are interpreted by the software and input into the electronic device.

6. The method of claim 5 wherein the single Braille pattern comprises one of a six-point or an 8-point Braille pattern.

* * * * *